United States Patent [19]

Daggett

[11] Patent Number: 4,630,188
[45] Date of Patent: Dec. 16, 1986

[54] MULTI-ZONE RAMP SYSTEM FOR DIGITAL PULSE GENERATOR AND LARGE SCALE INTEGRATED CHIP EMBODYING THE SAME

[75] Inventor: Kenneth E. Daggett, Murrysville, Pa.

[73] Assignee: Westinghouse Electric Corp., Pittsburgh, Pa.

[21] Appl. No.: 793,037

[22] Filed: Oct. 30, 1985

[51] Int. Cl.⁴ .......................................... H02M 7/155
[52] U.S. Cl. ...................................... 363/129; 363/87
[58] Field of Search ...................... 363/79, 85, 86, 87, 363/127, 128, 129, 147

[56] References Cited

U.S. PATENT DOCUMENTS 4,164,015  8/1979  Espelage et al. .................... 363/129

Primary Examiner—Peter S. Wong
Assistant Examiner—Anita M. Ault
Attorney, Agent, or Firm—Charles M. Lorin

[57] ABSTRACT

A ramp generator includes a master counter repeatedly ramping through for ramp-intersect operation of a digital pulse generator, while firing at the intersection, or when above the reference will cause a complementary digital change to define with the master counter count a ramp count on a subsequent ramp and adjacent zone below, thereby to adjust rapidly to a fast change of reference.

17 Claims, 17 Drawing Figures

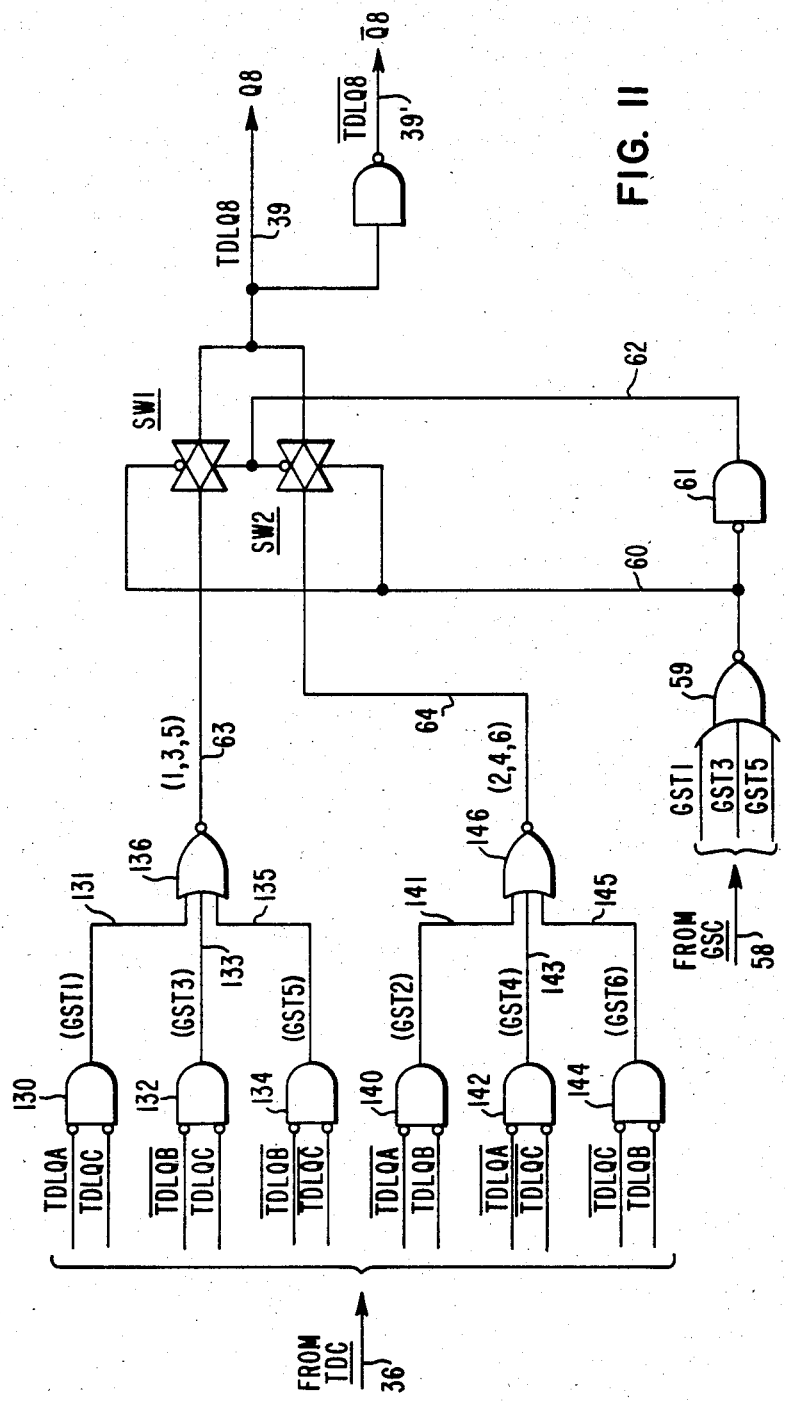

MULTI-ZONE RAMP SYSTEM FOR DIGITAL PULSE GENERATOR AND LARGE SCALE INTEGRATED CHIP EMBODYING THE SAME

BACKGROUND OF THE INVENTION

The present invention relates to ramp-intersect digital firing control systems. Digital pulse generators are known to include a comparator which detects the desired firing angle in relation to a synthesized time dependent reference synchronized with one phase of AC lines upon which thyristors are connected for sequential firing. See for instance U.S. Pat. Nos. 4,173,722; 4,028,609 and 4,017,744.

The prior art shows the use of equidistant firing delay circuits as applied to power converters and motor drive controllers. Ramp-intersect is applied consisting in deriving, from one phase of the AC power lines, a representation of the electrical angles from zero-crossing to zero-crossing, and in comparing such "running-count" with a reference signal representing a desired firing angle for the respective static power switches.

The trend in power electronics being to use "all digital" control systems with a microprocessor facility, the prior art has implemented gate pulse genernators which are microprocessor-based.

The prior art has been deficient in at least two respects. The digital implementations have been unable to provide a rapid response of the digital pulse generator to sudden changes in the reference signal determining the firing angle. The present invention provides for such immediate response. Moreover, it is desirable in all "all digital" system to be able to maximize the use of large scale integrated (LSI) circuit techniques. This depends to a large degree upon an easy interface of the digital control system between the control inputs and the microprocessor. The present invention allows an LSI chip to be interfaced easily and directly to a reference voltage determining the firing angle in a ramp-intersect digital control system.

It is also desirable to use a picket-fence signal and a pulse suppressor, as well as to accommodate end-stop technique, typically as shown in the Detering U.S. Pat. Nos. 4,028,609 and 4,173,722.

SUMMARY OF THE INVENTION

The present invention resides in a large scaled integrated (LSI) circuit combining a time delay counter, a gating state counter and a logic circuit responsive to said counters for the generation of gate pulses to sequentially fire static power switches.

The time delay counter (TDL) characterizes successive predetermined ranges of electrical angles within the fundamental sine wave, and the gating state counter (GST) characterizes the firing steps. The logic circuit correlates the states of counters TDL and GST so that the ramp-intersect function be carried out within an identified one of a plurality of such predetermined electrical angle ranges, or ramp zones, and firing occurs in the absence of such an intersection to cause a shift to the next ramp and to an adjacent ramp zone, so that subsequent firing of a thyristor be immediately adjusted to operate with the "next" ramp and within a ramp zone corresponding to a new level of the firing angle reference signal. The logic circuit reacts internally to successive firing commands so as to jump from ramp to ramp and/or from ramp zone to ramp zone, in response to either a change in reference signal, an end-stop, which are provided direct access into the large scale integrated chip according to the invention, all functions being integrated within such single LSI chip.

The option is also available to provide pulse suppression in association with the LSI clip according to the invention.

BRIEF DESCRIPTION OF THE DRAWINGS

FIG. 11 is the part of the logic circuit used to generate signal Q8 of FIG. 5;

DESCRIPTION OF THE PREFERRED EMBODIMENTS

Figure 1:
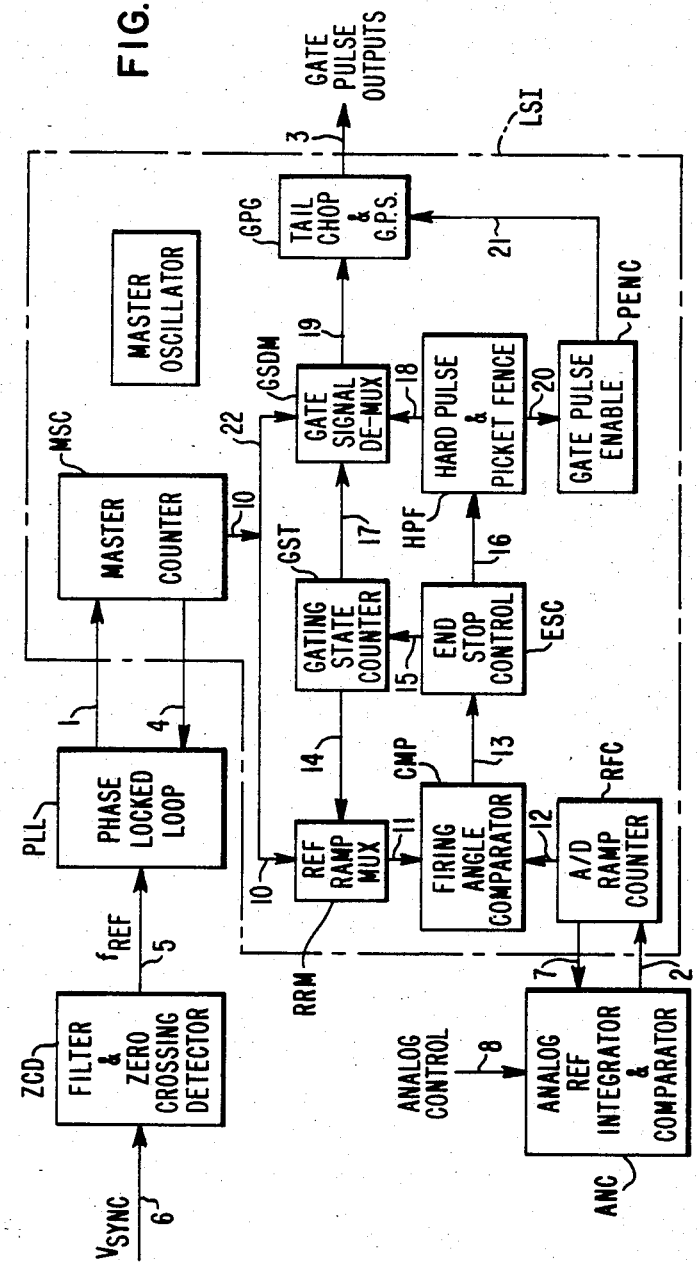
FIG. 1 shows in block diagram the internal organization of the LSI chip according to the invention.

Referring to FIG. 1, the large scale integrated (LSI) circuit according to the present invention is shown to respond on line 1 to a phase-locked-loop circuit PLL and on line 2 to an analog circuit ANC delivering a voltage reference signal representing the desired firing angle. The LSI circuit generates on lines 3 the gating pulses which command the gate pulse generator associated with the respective static power switches. As generally known, the phase-locked-loop (PLL) receives a feedback frequency signal SYNC on line 4 from the LSI, and the PLL circuit responds to a frequency signal on line 5 which is generated by the zero-crossing detector ZCD, itself responsive on line 6 to one fundamental phase of the AC lines to which the static power switches are connected for sequential conduction. Similarly, as generally known, the analog circuit ANC is responsive to a feedback signal on line 7 from the LSI circuit, while being responsive to the analog firing angle reference signal of line 8 for integration and comparator purposes.

As shown in block diagram within the dotted line LSI block, a master counter MSC responds to the pulse signal of line 1 from the phase-locked-loop PLL to generate on line 10 a "running count" representing electrical angles. From line 10 the system goes to a reference ramp multiplexer RRM which generates in digital form, on line 11, a "ramp count" which is to be matched with a firing angle, or "reference count", by the ramp-intersect method. This is achieved by a comparator CMP which responds on line 12 to the count derived from a reference ramp counter RFC in relation to the assigned value from line 2 and analog circuit ANC. When an intersection takes place between the ramp count of line 11 and the assigned reference count of line 12, a firing command is generated on line 13 by comparator CMP.

As explained hereinafter, the reference ramp multiplexer RRM according to the invention is responsive to the output on line 10 from the master-counter MSC and to the current state derived on line 14 from a gating state counter GST, as set by the firing command on line 13, via end-stop circuit block ESC, and line 15.

Figure 2:
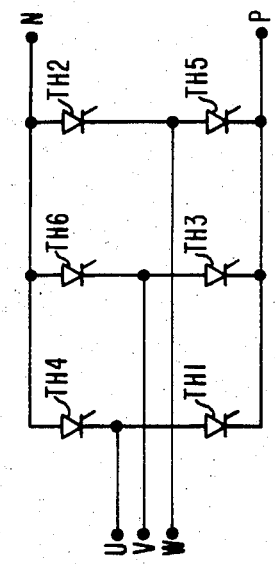
FIG. 2 shows a thyristor array as can be controlled for firing by the LSI chip according to the invention.

FIG. 2 is illustrative of a thyristor bridge connected between the three-phase lines U, V, W of an AC power supply. The bridge typically includes six thyristors THI–TH6 connected by pairs, each forming one pole between positive and negative terminals P and N, with one phase line as midpoint in each pole.

Figure 3:
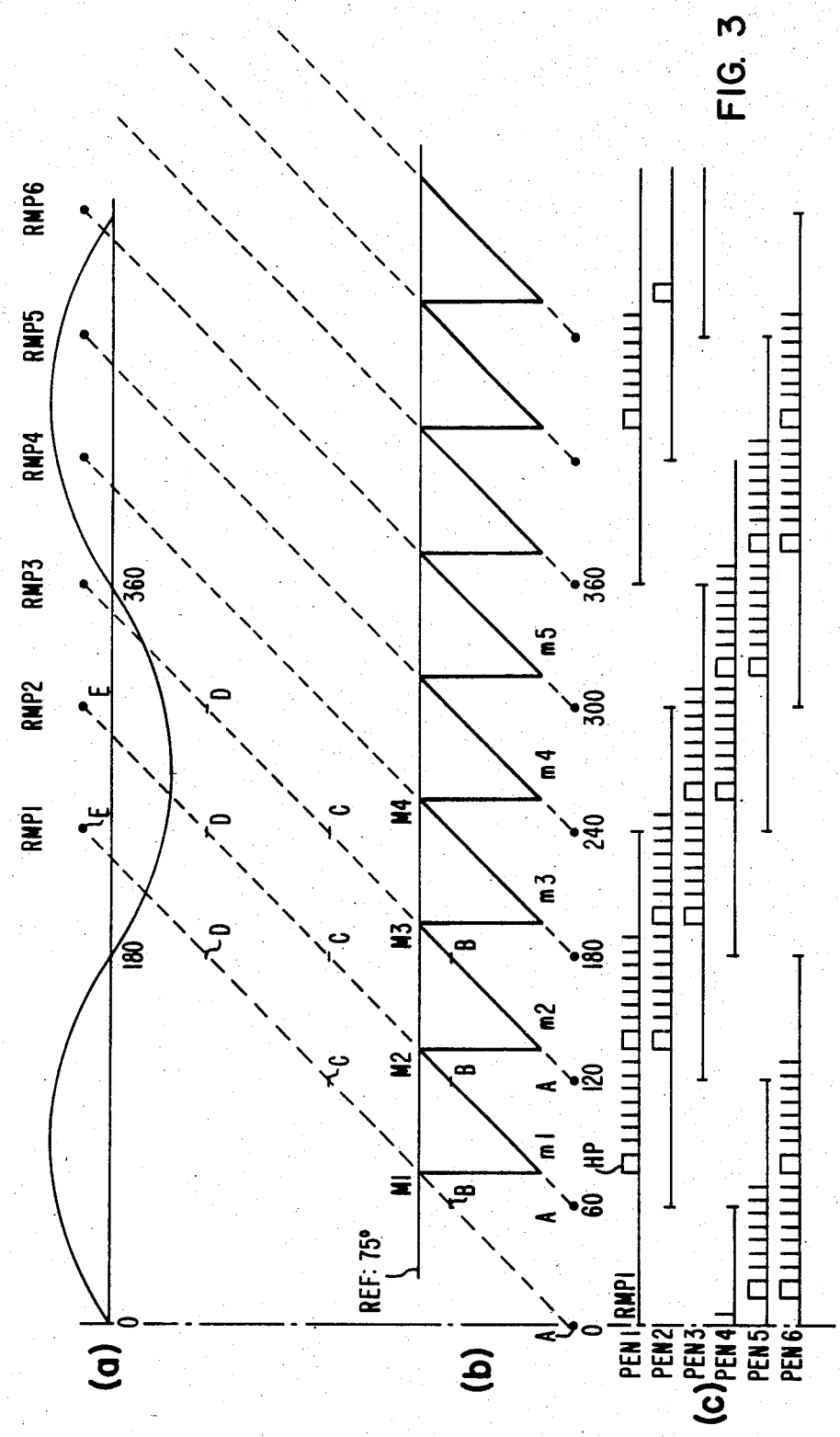
FIG. 3 shows the curves equidistant firing with six individual ramps according to the invention.

FIG. 3 illustrates with curves the ramp-intersect method used according to the present invention. Curve (a) is the fundamental AC wave used as input synchronizing signal on line 6 of FIG. 1. It also represents electrical angles from zero-crossing to zero-crossing over 360°. Curve (b) illustrates six ramps RMP1–RMP6 phase shifted from one another by 60° through the entire 360° of fundamental curve (a). Each ramp contains ranges or ramp zones AB, BC, CD, DE which extend over 60° each, thus from 0° to 240° from A to E on each ramp. According to common practice, firing is not allowed typically beyond point E of any ramp, e.g. beyond 240°.

FIG. 3 also shows the reference signal REF which intersects any ramp, at 75° typically, thus in the ramp zone BC. The operative point with equidistant firing are M1–M6, on the respective ramps RMP1–RMP6. Upon firing, say at M1 in zone BC, the counter falls upon operative point m1 on the next ramp and ramping occurs in zone AB, then beyond to M2 in zone BC, and so on.

Enabling of such ramp operation between 0° and 240° is achieved from line 21 and gate pulse enable circuit PENC (FIG. 1). As illustrated in FIG. 1, the command signal of line 13 goes to a hard pulse and picket-fence generator HPF, via an end-stop controller ESC inputting by line 15 into the gating state counter GST, and by line 16 into hard pulse and picket fence generator HPF. A gate pulse enable circuit PENC is interposed between the outputted triggering pulse of line 20 from generator HPF and line 21 which goes into gate pulse generator GPG. The latter applies the gate pulse proper by one of several lines 3 to the one among thyristors TH1–TH6 which is "next" to be activated in sequence, outside the (LSI) circuit. The gating state counter GST feeds by line 17 into gate signal demultiplexer GSDM which, via line 19, goes to the gate pulse generator GPG for the determination by the distributor of which of the output lines 3 in the sequence, i.e. which of the thyristors, should be activated. Demultiplexer GSDM responds to the current state of the gating state counter GST and to the master count from lines 10, and 22 which carry the timing wave. The outputted signal of line 19 is also used by the gate pulse generator GPG to implement the tail-chop feature, embodied therein with pulse enable signals PEN1, ... PEN6 for the respective ramps, as shown under (c) in FIG. 3.

Equidistant digital gate pulse firing of thyristors TH1–TH6 is illustrated in FIG. 3 by the intersection of the reference REF with the various ramps at respective operative points M1–M6. For each operative point, comparator CMP generates, by lines 13, 16 and circuit HPF, a hard pulse HP shown under (c) and followed by discrete picket-fence signals in series thereafter. Besides the internal organization of the large scale integrated chip LSI of FIG. 1, the invention provides for an immediate response of the gating pulse generator GPG to any rapid change in the magnitude of the reference signal of lines 8 and 2, above or below the level REF illustrated in FIG. 3 on each ramp.

Referring again to FIG. 1, the operation is as follows: The signal of line 6 defines the phase relationship of the gating signal GP1 for thyristor T1, under ramp RMP1, in the illustrated six-pulse bridge thyristor power circuit. The synchronizing signal of line 6 is, thus, in phase with the commutation voltage applied to thyristor TH1, e.g. the line-to-line voltage U-W. The signal of line 6 passes through a low-pass filter introducing a time delay, typically of 75 electrical degrees at 60 Hz. Such delayed signal is converted into a square wave by the zero-crossing detector ZCD. The pulse signal of line 5, is thus the reference input to phase-lock loop PLL. As generally known, at the output, on line 1, appears a pulse signal which is a multiple of the frequency of line 5. A synchronizing signal is fed back on line 4 from the master-counter MSC within the LSI chip. The master-counter, typically, includes a 8-bit counter proving $2^8 = 256$ counts per 60° for a total of 1536 states per cycle. Therefore, each state represents 0.2234 electrical degrees. With the master-counter is associated a digital circuit for deriving six individual ramps RMP1–RMP6 at 60 degrees to one another.

The output derived from such individual ramps, selected in accordance with the order of firing, is applied as an input to the firing angle comparator CMP. In fact such separate outputs are applied via a reference ramp multiplexer RRM which is logically set in accordance with the current state of the various ramps in relation to the master-counter MSC, and to the current state (GST1–GST6) of the gate pulse generator in relation to the various thyristors. In other words, the gating state counter GST and the reference ramp multiplexer RRM provide the capability of shifting the phase relationship of the time angle information with respect to the synchronizing signal of line 6. The gating state counter is in fact determining the offset amount relative to the ramp signal. Moreover, the outputs of the gating state counter are correlated with decoded time delay counter outputs so as to determine which of the gate pulse signal outputs of lines 3 will be active at any given time within the fundamental cycle of line 6.

Considering now the opposite side of the firing angle comparator CMP, another set of inputs is there interfaced with circuitry associated with A/D conversion for the REF signal representative of the firing angle control information. Firing, or initiation of gate pulse generation, by circuit GPG upon any given channel on lines 3, can be considered to occur at the instant in comparator CMP the following equation is satisfied: $V_{in} + V_{ramp} > V_{threshold}$, where $V_{in}$ is the input firing angle control voltage; where $V_{ramp}$ is the voltage equivalent of the ramp; and $V_{threshold}$ is a fixed constant characteristic within the comparator. The implication is that $V_{threshold}$ is equal to the maximum value of $V_{ramp}$. If the maximum value of $V_{ramp}$ is 1, firing occurs whenever $V_{ramp} > 1 - V_{in}$.

It appears that the count on the ramp represents the digital complement of the count representing the analog reference voltage which defines the firing angle at the input of the comparator. Thus, it is the count of line 12. Accordingly, the inverted digital representation of the analog control voltage of line 2 is used on line 12. When the ramp-intersect event occurs, meaning the ramp has reached the firing angle, the output of the comparator generates on line 13 a digital one-shot, and by line 16 causes a hard pulse HP to be generated on line 20. At the same time, by line 15, the gating state counter GST is advanced. Initiation of these functions is also under control of the "End-Stop" controller ESC, to prevent excitation of firing until the ramp voltage is, typically, greater than 7.5 electrical degrees. Moreover, the End-Stop circuitry forces triggering of the hard pulse generator HPF by line 16, whenever a phase delay of 225 electrical degrees is reached in the absence of a command from the firing angle comparator CMP.

Figure 4:
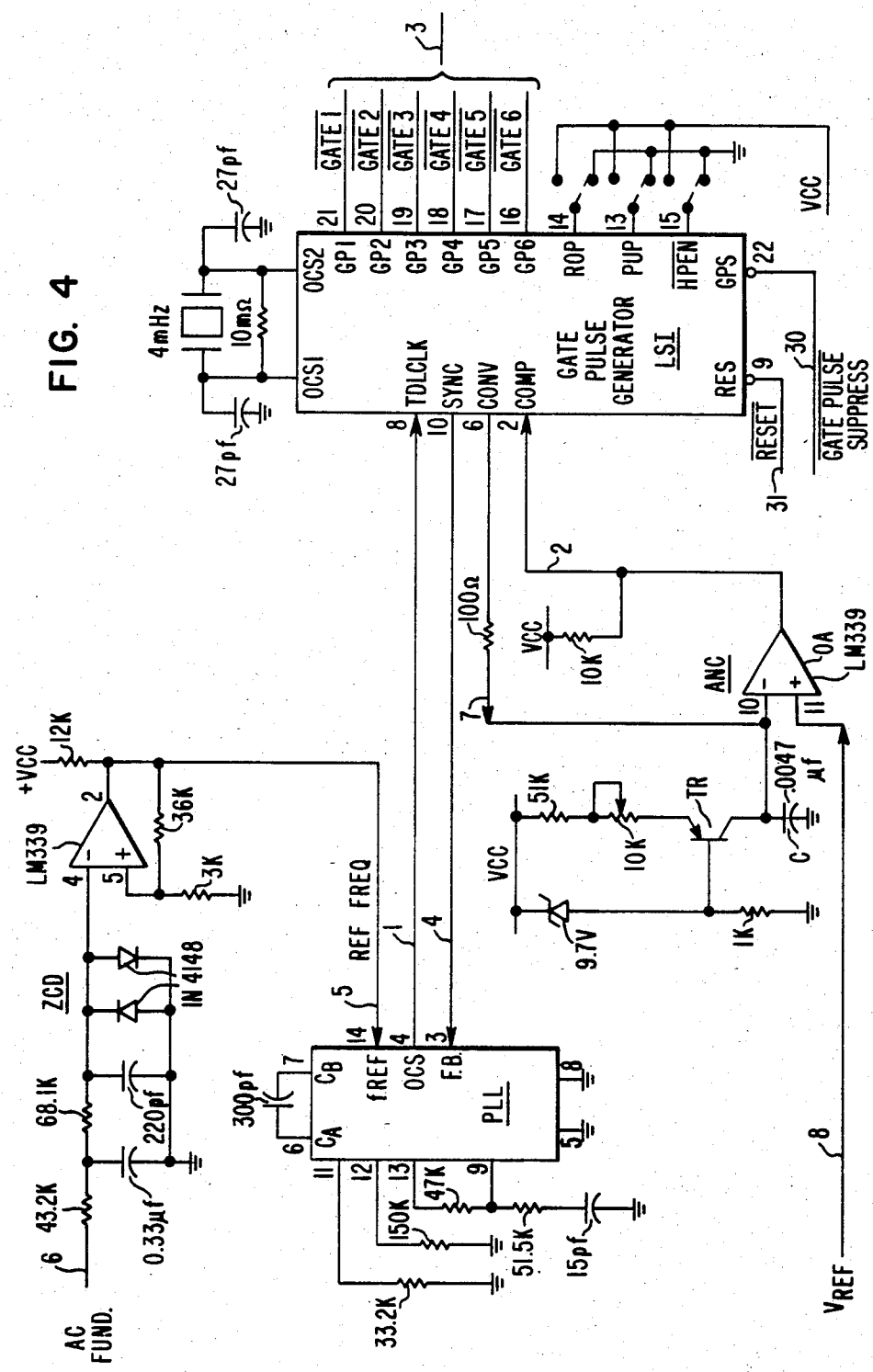
FIG. 4 illustrates the LSI chip according to the invention interfaced with external circuitry.

Referring to FIG. 4, circuit implementation of the block diagram of FIG. 1 is illustrated in connection with a single chip LSI. The zero-crossing detector ZCD with the input frequency signal of line 6 feeds by line 5 into the phase-locked loop PLL. The oscillator therein (circuitry shown connected to pins 6, 7, 9, 11, 12, 13) clocks by line 1 (pin 4 of PLL) one input (pin 8) of the LSI chip (for the time delay counter TDL (a Johnson counter therein), and the solid state phase-locked-loop PLL device receives (from pin 10 of the LSI chip) a synchronizing pulse fed back by line 4 to pin 3 of the PLL.

The analog circuit ANC includes an operational amplifier OA which receives on line 8 the analog reference voltage REF assigning a specific firing angle. Capacitor C is charged through transistor TR from the associated constant current source (VCC) until the voltage impressed upon the capacitor is equal to the input control voltage of line 8. The time interval necessary for charging of the capacitor is measured within the LSI chip between pins 2 and 6 thereof. Pin 2 is used to control charging and discharging (from line 2 at the output of the operational amplifier) of the integrating capacitor C, whereas pin 6 of the LSI is used for the feedback loop of the operational amplifier by line 7, thereby to indicate equivalence of the integrating capacitor voltage with the input control voltage of line 8. Between these two events a counter within the LSI chip performs counting and provides digital conversion, the digital reference being outputted on line 12 to comparator CMP.

The LSI chip contains circuits shown in block diagram within dotted lines in FIG. 1. It appears that the LSI chip, while fulfilling all the functions required under the present invention, requires only a minimum interface (clock from line 1, feedback on line 4, conversion on line 7, analog comparison on line 2), with the addition of gate-pulse-suppression on line 30 (pin 22), and a reset function on line 31 (pin 9). The outputs for gating of the power switches are on pins 16 to 21, connected to lines 3 of FIG. 1.

Figure 5:
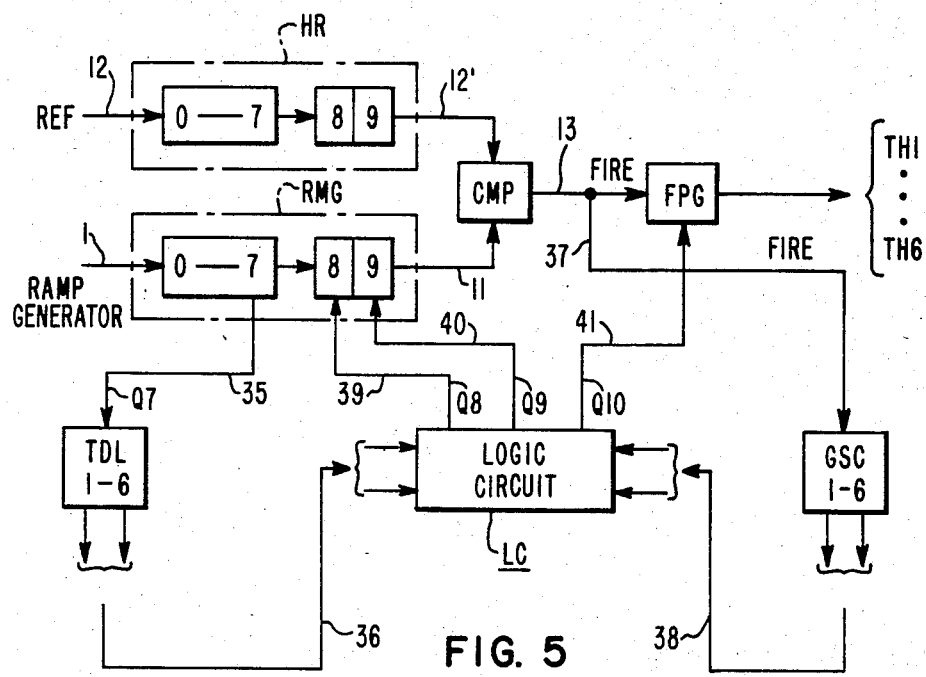
FIG. 5 is a block diagram illustrating the logic circuit and the ramp generator according to the invention.

Referring to FIG. 5, the operation and control of the comparator CMP in relation to reference ramp multiplexer RRM and master-counter MSC will now be described and explained:

Holding register HR, typically is a 10-bit register loaded with a reference count derived from line 12. A ramp generator RMG, of 10-bit also, clocked by the signal of line 1 (FIG. 1), provides a ramp count which is compared with the reference count of line 12 by comparator CMP. When intersection occurs, comparator CMP sends on line 13 a command to the firing pulse generator FPG.

Figure 5A:
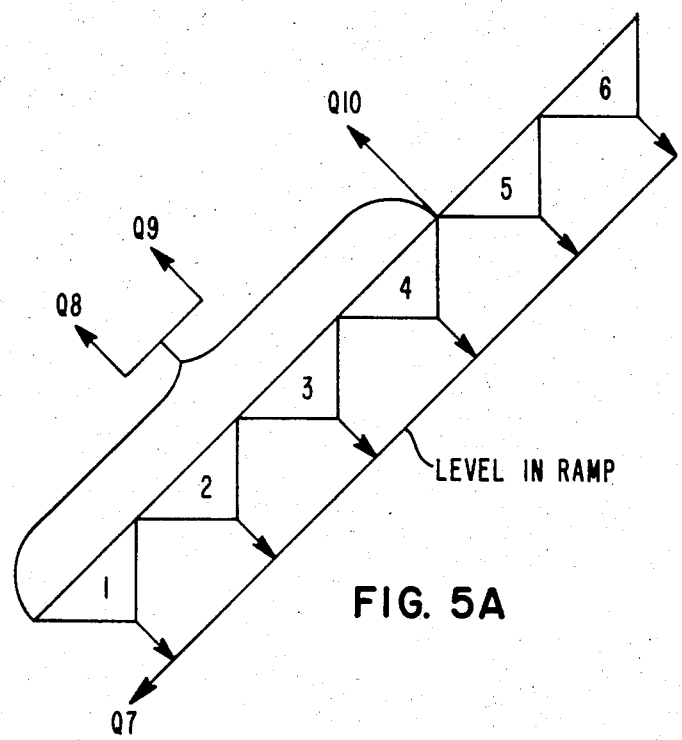
FIG. 5A illustrates the operation of the ramp.

Upon each counting to the maximum (Q0-Q7) of the 8-bit portion of ramp generator RMG, a signal Q7 is by line 35 put through to clock a time-delay counter TDL, in the form of a Johnson-counter, which ouputs on logic lines 36 one combination representing one of six successive states. In other words, six successive sub-states (see FIG. 5A) of the main ramp of the master-counter are thereby identified on lines 36. Upon each firing command from line 13, the firing pulse generator FPG causes a corresponding thyristor TH1-TH6 to be fired in the sequence. At the same time, via line 37, the command of line 13 advances another Johnson-counter GSC providing at its ouput, on logic lines 38, an indication, (among six possible states of the gating state last fired in the sequence), of the gating state "next" to occur.

The output lines 36 and 38 from TDL and GSC respectively, are applied to a logic circuit LC which outputs three logic signals Q8, Q9, Q10, respectively on lines 39, 40 and 41. Signals Q8 and Q9 determine the state of the two most significant digits in the ramp generator RMG. Q10, as explained hereinafter, causes firing by the gating pulse generator independently from comparator CMP and thereby advances state counter GST. The function of digits Q8 and Q9 will now be explained by reference to FIGS. 6A-6D.

Figure 6A:
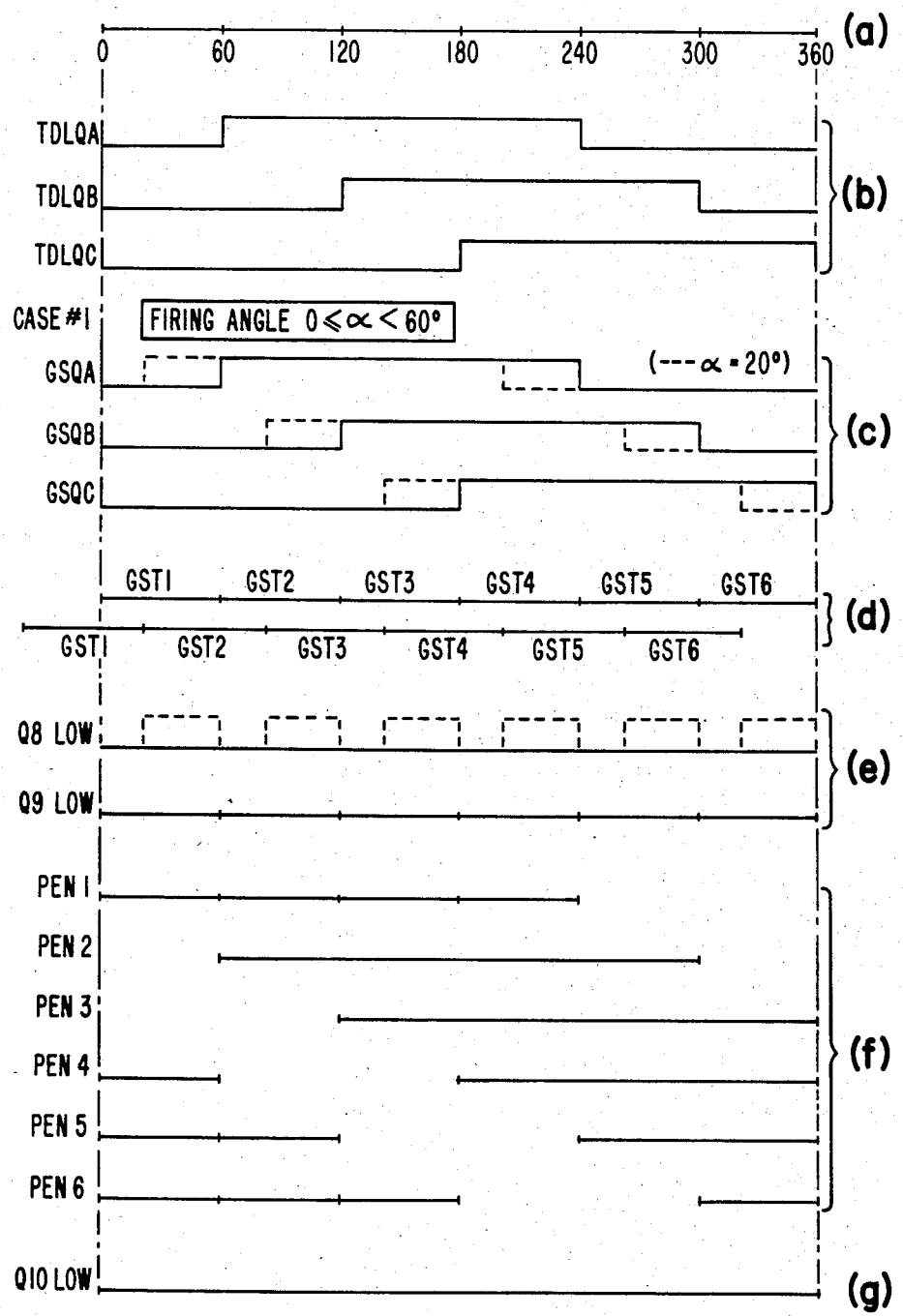
FIGS. 6A-6D illustrate with curves the operation of the digital pulse generator according to the invention for six different zones of firing, respectively.

On FIG. 6A under (a) a sinusoidal curve is graphically represented in the electrical degrees corresponding to a complete cycle of the fundamental on the AC lines. The Johnson-counter TDL consists of three bistable devices A, B and C occupying successive states during the cycle, as shown by TDLQA, TDLQB and TDLQC under (b). Each time the command signal Q7 of line 35 triggers delay counter TDL, another 60° ramp zone has been completed, and another 60° ramp zone is being initiated within the 8-bit portion of master-counter MSC.

Similarly, under (c) are shown, by GSQA, GSQB an GSQC in solid line, the successive states at the output of the Johnson-counter forming the state counter GSC, initially positioned for nearly 60°=firing angle and before the first firing pulse on TH2. Curves (b) and (c) show the relationship between TDL and GSC on either side of logic circuit LC initially. Under (d) are shown the gating states for the thyristors. GST1, the gating state for thyristor TH1, shows firing of TH1 nearly at the end of its 0°-60° window; GST2 follows for its own 0°-60° range as opposed to the 60°-120° window of the fundamental, etc. as sequentially distributed one after the other. Each of the states GST1, GST2, defines in electrical degrees a window, or ramp zone.

In addition, under (f), permissible firing by the comparator is shown to be limited to four successive ramp zones, i.e. four times 60°, or 240° the maximum firing angle possible, typically. Thus, each signal PEN1, ... PEN6 defines for an individual ramp a maximum range of operation, it being understood that from the master-counter are derived individual ramps phased at 60° to one another, which otherwise would extend to 360°.

In the prior art, while the ramp-intersect method is applied to an individual ramp in the sequencing order, i.e. firing of one thyristor causes the ramp, which is "next" in the order of phases (thus, at 60° phase shift), to be ramped up to the reference value, the comparison with the "next" ramp being performed all the way from zero to the reference. Equidistant firing between the thyristors is, thus, achieved as shown in FIG. 3. However, should there be a change in the reference, there will be a need for adjustment to a new intersection level, that is, until all the ramps are again being used successively with the same new firing angle, i.e. counting from an initial count to the same new reference angle, upon each ramp successively. The object of the logic circuit according to the present invention is to make such adjustment faster than with the prior art, upon any intervening change of the reference signal.

To this effect, the logic circuit LC responds to the states TDLQA, TDLQB, TDLQC for the delay counter (lines 36), and the states GSQA, GSQB, GSQC for the state counter (lines 38), and generates logic signals Q8 (line 39), Q9 (line 40), as shown under (e) in FIG. 6A.

FIG. 6A assumes that the firing order GST1, GST2 . . . GST6 is such that each thyristor is available for firing in a 60° range of firing angle. Accordingly, GST1 matches 0°-60° on the fundamental (curve (a)), whereas GST2 is operated according to a ramp which is at 60° phase shift, thus matching also the range 0°-60° for its active phase as opposed to the zone 60°-120° of the fundamental (curve (a)), and so on for GST3, ... GST6. All the states in the zone 0°-60° for TDLQA-TDLQC and for GSQA-GSQC are low. A different logical combination identifies the following range, and so on. Since firing is enabled only in a range from 0° to 240° firing angle (PEN1-PEN6), there are only four such different logical combinations possible. Therefore, it is possible to identify those four logical combinations by two binary numbers (Q8, Q9).

FIGS. 6A-6D show under (e) the four possible combinations which characterize a firing angle range of 0-60; 60-120; 120-180; and 180-240, respectively, namely (Q8, Q9)=00; (Q8, Q9)=10; (Q8, Q9)=01; and (Q8, Q9)=11.

Referring again to FIG. 6A (case #1) for firing angles in the 0°-60° range, if firing occurs in such a range, typically at 20° (as shown in dotted line), Q8, which was assumed to be low initially, becomes a ONE temporarily (as shown in dotted line). However, due to the firing pulse, the firing state for the "next" thyristor is advanced to the instant of firing, as shown by the second series of states GST1, GST2, . . . , indicated below under (d). Therefore, the logic, or correspondence between GST1, GST2, . . . and the 0°-60° ramp zone is restored. Q8 after it has settled becomes again low, as before. More generally, Q8 remains low during the entire cycle, for the purpose of the logic circuit LC.

Figure 6B:
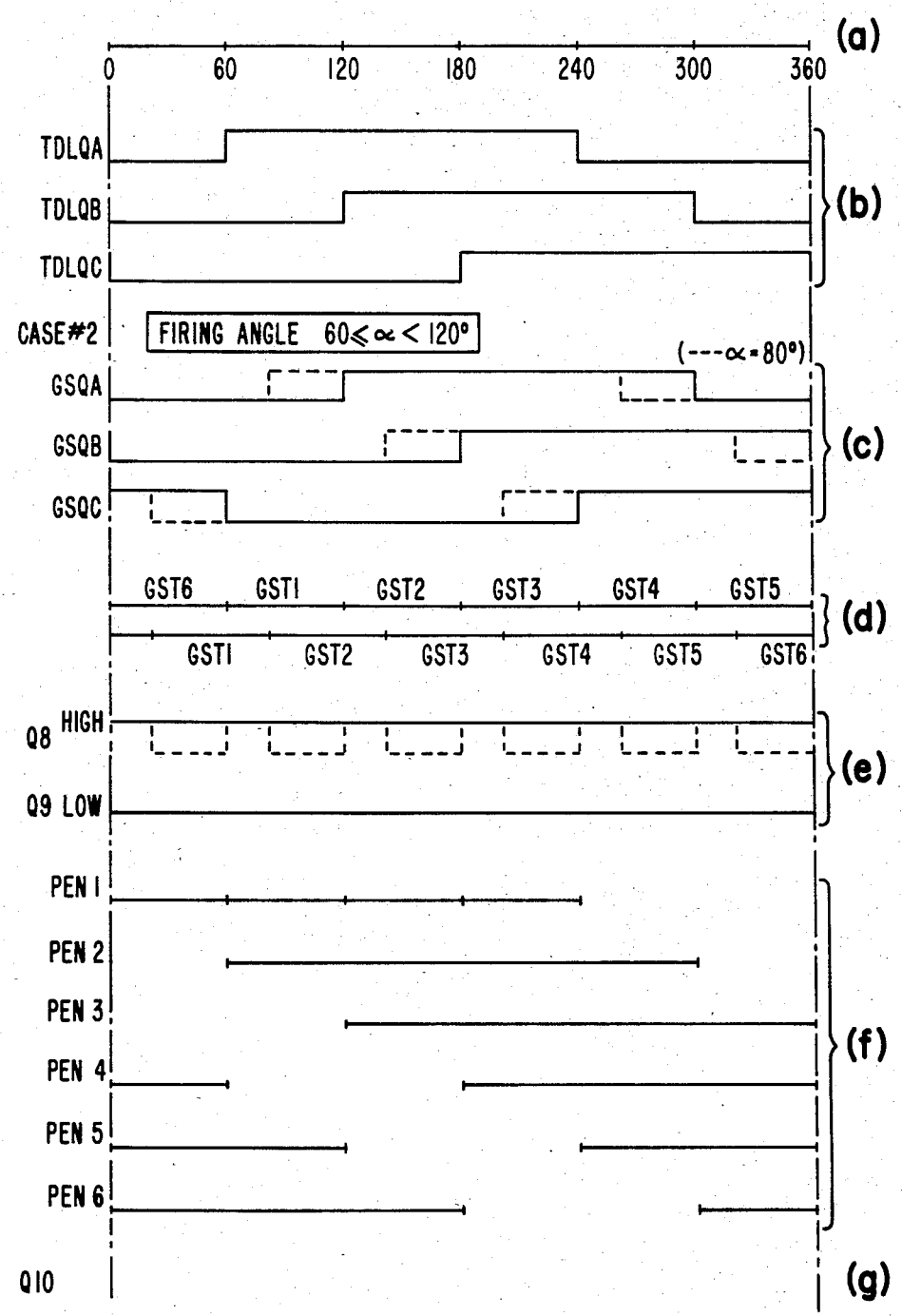

Considering now case #2, or FIG. 6B, the ramp zone is here between 60° and 120°. Accordingly, GST1 for thyristor TH1 is aligned with the 60°-120° of the fundamental, whereas GST2 for thyristor TH2 is aligned with the ramp zone 120°-180° of the fundamental, which also represents 60°-120° for the corresponding ramp RMP2, and so on for GST3 and ramp RMP3; GST4 and ramp RMP4, . . . As compared with FIG. 6A, TDLQA-TDLQC are unchanged but GSQA-GSQC are shifted by 60° to the left. The logical combination is now Q8 high and Q9 low, during the entire cycle. When firing occurs, say at α=80° (as shown in dotted line) the GSC counter is advanced (as shown in dotted lines by GSQA, GSQB and GSQC) and GST2 (under (d)) is immediately advanced to the firing instant thereby restoring the logic (Q8, Q9)=01 (Q8 temporarily brought to a low, has been returned to a high).

Figure 6C:
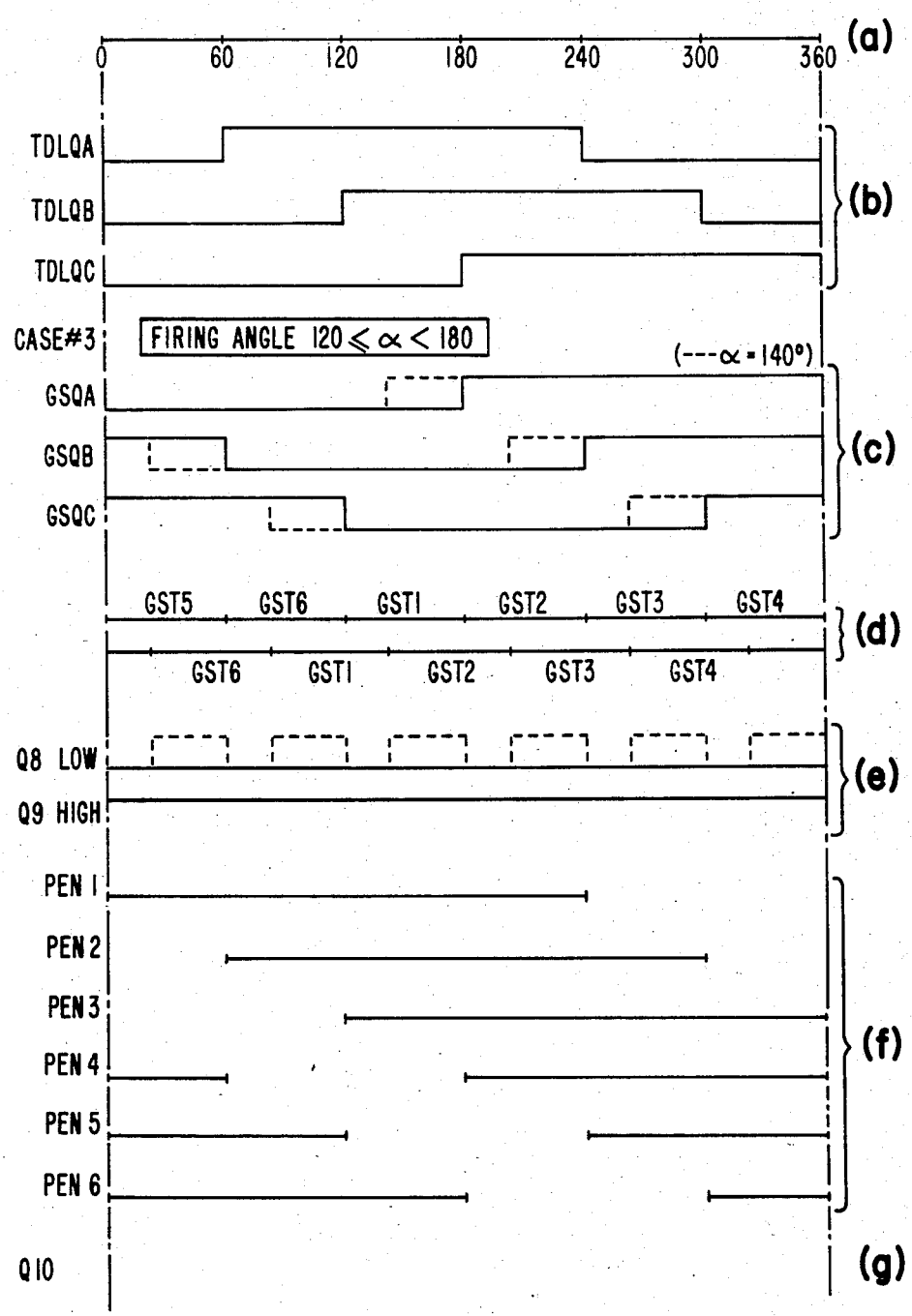
Figure 6D:
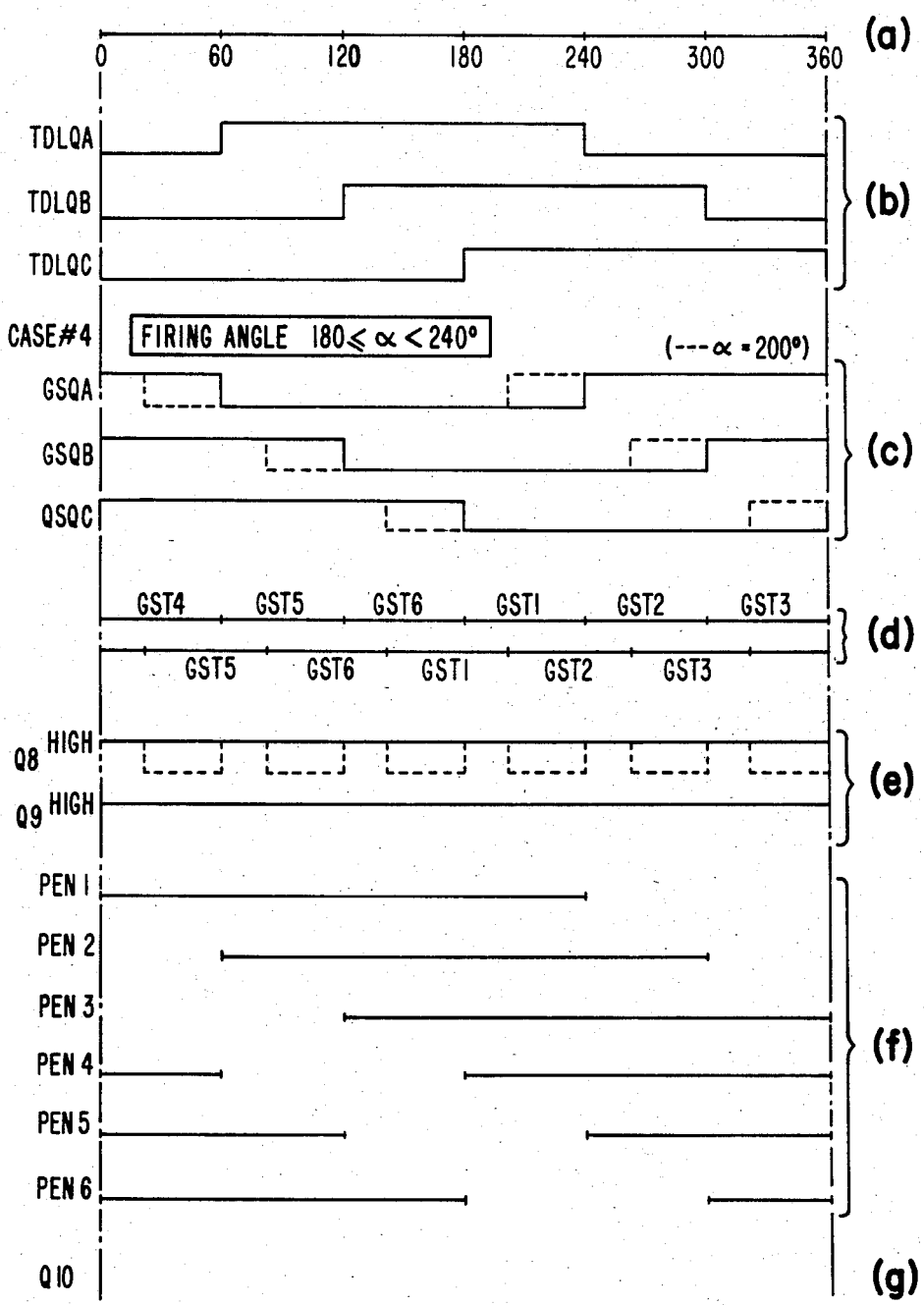

The same conclusion can be reached for cases #3 and #4 with respect to FIGS. 6C (ramp zone 120°-180° and firing instant at α=140°), and with respect to FIG. 6D (ramp zone 180°-240° and firing instant at α=200°). It is recalled that Q8=0, Q9=0 in the case of FIG. 6A; Q8=1 and Q9=0 in the case of FIG. 6B; Q8=0, Q9=1 in the case of FIG. 6C and Q8=1, Q9=1 in the case of FIG. 6D. Therefore, the logic states of Q8 and Q9 define digitally whether the operative ramp zone is 0-60; 60-120; 120-180; or 180-240 along any of the ramps at any given instant.

While only four zones, and therefore only two digits Q8, Q9, are necessary to identify a ramp zone, (the firing angle in practice should not exceed 240°), whenever the reference would call for a ramp-intersect operating point higher in the ramp, a third digit Q10 is generated by the logic circuit LC to force firing and, therefore, make the system operate as if the reference were set at 240°.

Considering the TDL and GST states, Q8 tells by being low (Q8 a zero) that GST1 is in the first, or third zone, GST2 likewise when it is its turn, etc . . . , whereas Q8 tells by being high (Q8 a zero) that GST1 is in the second or fourth zone, GST2 likewise when it is its turn, etc . . . all in accordance with curves (a), (b), (c), (d) and (e) of FIGS. 6A-6D. PEN1-PEN6 under (f) in FIGS. 6A-6D tell whether the respective and prospective states GST1, . . . GST6 are permissible, i.e. enabled.

With regard to GST1, for example, it appears that PEN5 tells whether GST1 is within one of zones #1 and zone #2 (FIGS. 6A and 6B) or within one of zones #3 and #4 (FIGS. 6C an 6D) depending upon PEN5 low or PEN5 high.

It being so, it also appear that:

Q8 tells whether GST1 is in one of zones 1 and 3 or in one of zones 2 and 4, whereas PEN5+GST1 tells whether GST1 is within one of zones 1 and 2 or within one of zones 3 and 4. Therefore, Q9 is derived from PEN5 and GST1 and the combination Q8 Q9 will be 00 for zone 1, 10 for zone 2, 01 for zone 3 and 11 for zone 4.

The same can be said with GST2 and PEN6, GST3 and PEN1, etc . . . which all determine Q9 with the same logic. The combination Q8, Q9 will determine univocably for each prospective state GST1, GST2, . . . . whether the equidistant firing angle takes place in zone 1, zone 2, zone 3 or zone 4.

Should the shifting of states GSQA-GSQC tend to bring firing outside the permissible range (0°-240°), then PEN1-PEN6 will, respectively, forbid such operation. This is achieved by a logic comparison between the pairs (GST1, PEN1), (GST2, PEN2), . . . and the logic circuit LC will output a signal Q10 causing firing of the thyristor "next" in line. Therefore, as long as the reference signal is above 240°, firing will repeat itself from thyristor to thyristor at 240° and not more.

It appears also that with the binary succession 00, 01, 10, 11, each of the 8-bit counts on the mastercounter receives two complementary bits, Q8, Q9 establishing a "running count" on a 10-bit ramp identified by such (Q8, Q9) bits.

Instead of considering a steady reference level as in FIG. 3, or a reference beyond 240°, it will be now assumed that the reference suddenly gets lower.

Figure 7:
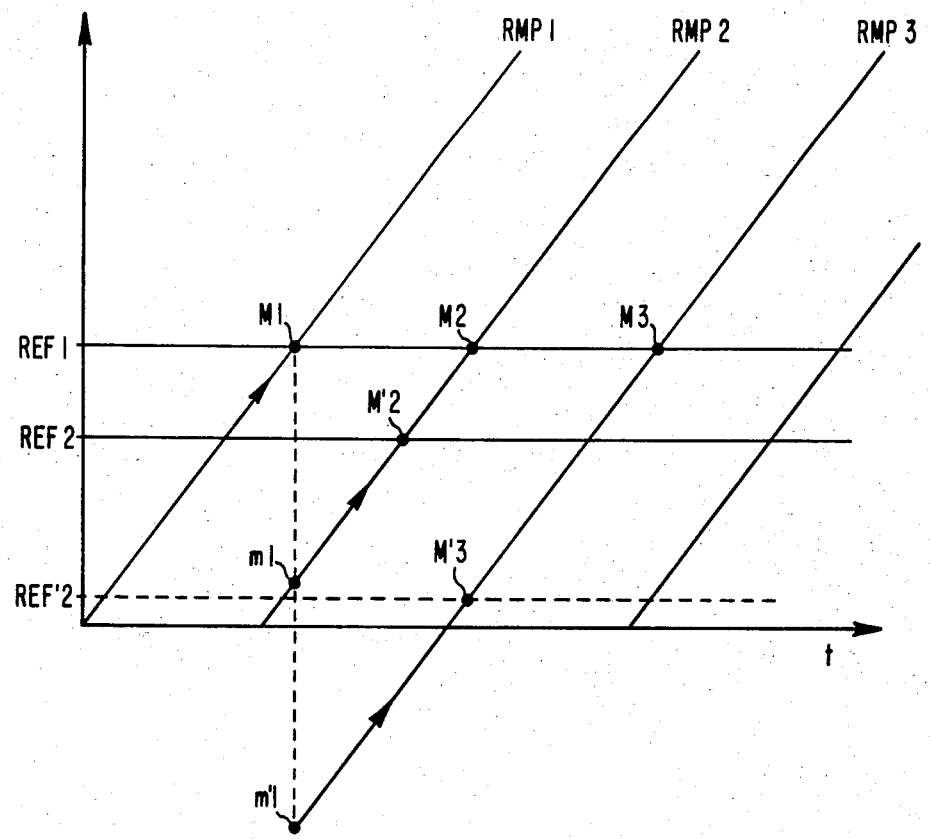
FIG. 7 shows ramp-intersect operation upon a change of level in the reference signal.

Referring to FIG. 7, considering ramps RMP1, RMP2, RMP3 . . . , assuming reference REF varies downward from REF1, REF2 or to REF'2, it is observed that normally the master counter MSC counts recurrently from 0 to the maximum count permissible by intersect level REF. Counting by MSC (8-bit) is independent from the choice of Q8, Q9 by the logic circuit LC. Indeed when ramping reaches to the level of REF, this causes firing by comparator CMP, which in turn causes a change of state in GSC. The change of state (curves (c) in FIGS. 6A-6C) is translated into a correlative change of state in the distributor (GST1-GST6), as shown in FIGS. 6A-6C under curves (d). If GST1 was the thyristor involved at the moment of firing, GST2 takes the same place with regard to the same electrical angle ranges, and ramp RMP2 is now involved by the said ramping process, but Q8 and Q9 are changed. Therefore, as shown in Figure 7, counter MSC, which had a given count for point (M1) at the instant of firing, has still be same count but at operating point m1 on ramp RMP2 in the zone below, i.e. the zone determined by the next (Q8, Q9) combination. At this time, if REF has become REF2 above point m1, counter MSC will continue counting by ramping until comparator CMP acknowledges the intersection at point M'2, instead of M2, and a firing pulse ensues for thyristor TH2. If, however, REF1 has been reduced to a value REF2' below the count for point m1, comparator CMP calls for another firing pulse which causes another change of state in state counter GSC (curves (c) in FIGS. 6A-6D) and a correlative gating of the distributor (GST1-GST6). Accordingly, counter MSC has the same count but on point (m'1) which is on the next ramp RMP3 in the zones below, as the logic circuit imposes by the combination Q8, Q9. Now, the operative point m'1 is below REF'2, so that, the master-counter can ramp up to M'3 corresponding to the value REF'2, for which thyristor TH3 is fired.

Figure 8:
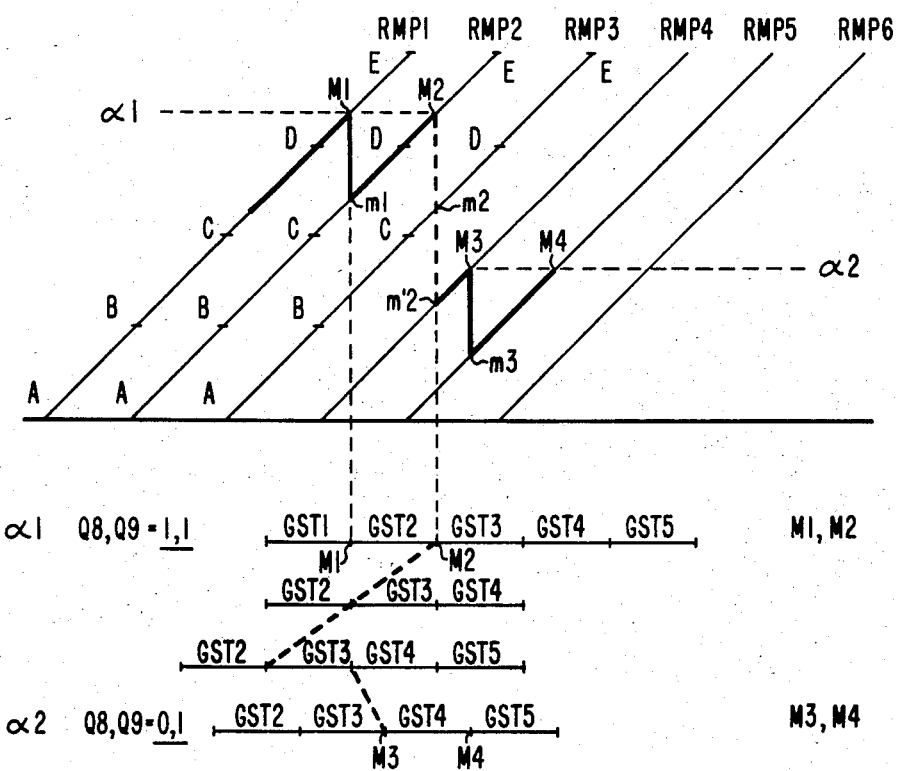
FIG. 8 illustrates the operation of the multizone ramp intersect generator of FIGS. 6A-6D.

Referring now to FIG. 8, the operation of the multizone ramp counter system according to the invention, will be now considered in the illustrative embodiment where there are four permissible zones AB, BC, CD, DE on each ramp, with each zone extending over 60°, with a maximum firing angle of 240°. Assuming the firing angle is α1 operative in the fourth of these zones (DE), the operative point M1 is reached by the master counter on ramp RMP1, thyristor TH1 is fired (GST1), and the distributor brings GST2 "next" in line from the instant of firing. Then, by the same process, M2 is reached on ramp RMP2. Firing of TH2 occurs and GST3 is "next" in line in the distributor. However, it is now assumed that the angle has become α2 lying in the second zone (BC). Then, when reading m2 on ramp RMP3 while being ready to count with MSC, comparator CMP detects that the reference α2 is below. Therefore, a pulse is fired toward TH3. As a result, GST4 comes in place, and without counting on RMP3, MSC is now counting on ramp RMP4 from m'2 until point M3 is reached on such ramp. The system operates thereafter for equidistant firing at M4 on ramp RMP5, etc.. . . The preferred embodiment of the multizone ramp generator according to the invention will be now described by reference to FIGS. 9, 10, 11 and 12.

Figure 9:
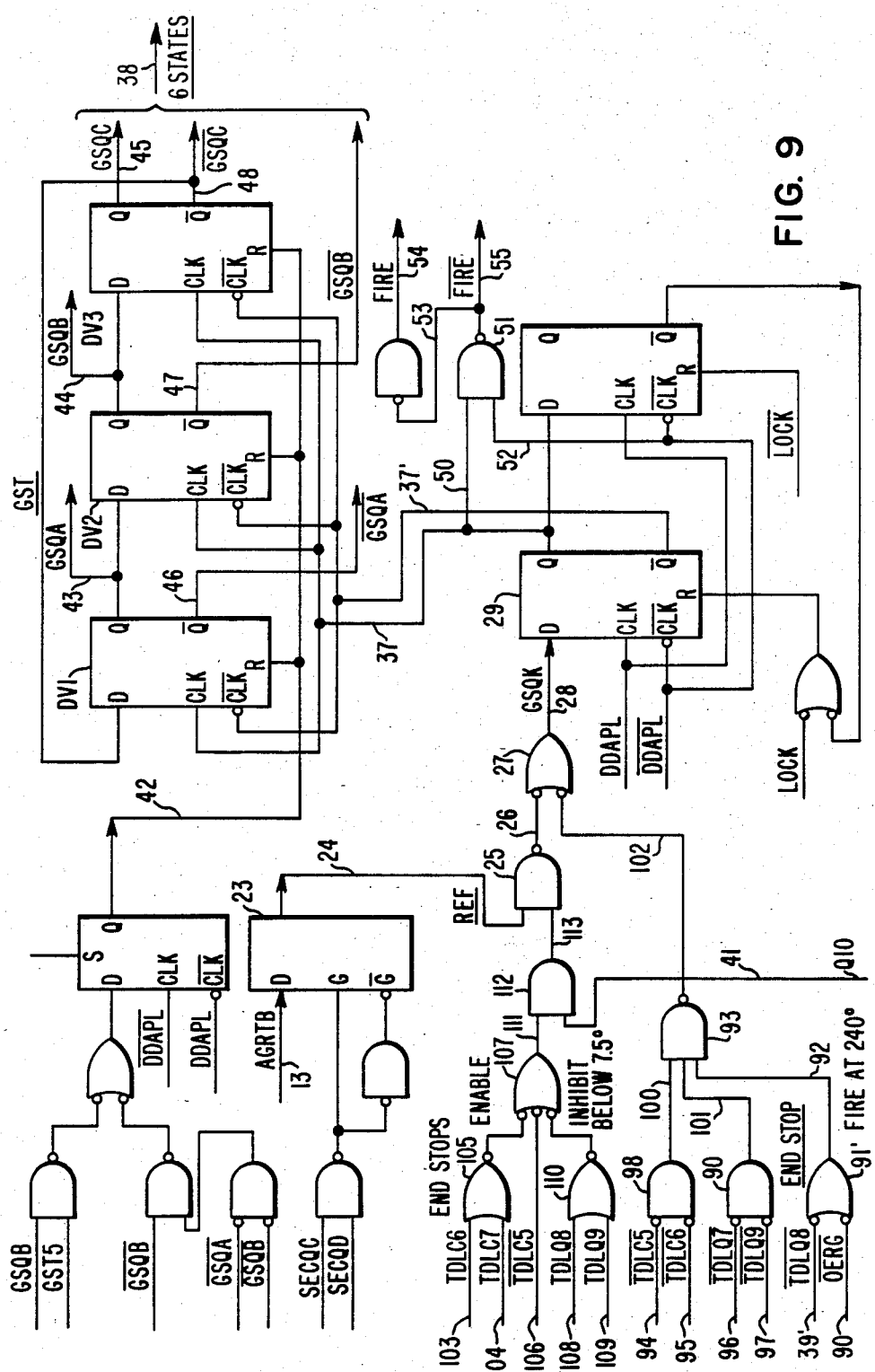
FIG. 9 shows the gating state counter and the associated firing logic circuit as part of the LSI chip of the invention.
Figure 10:
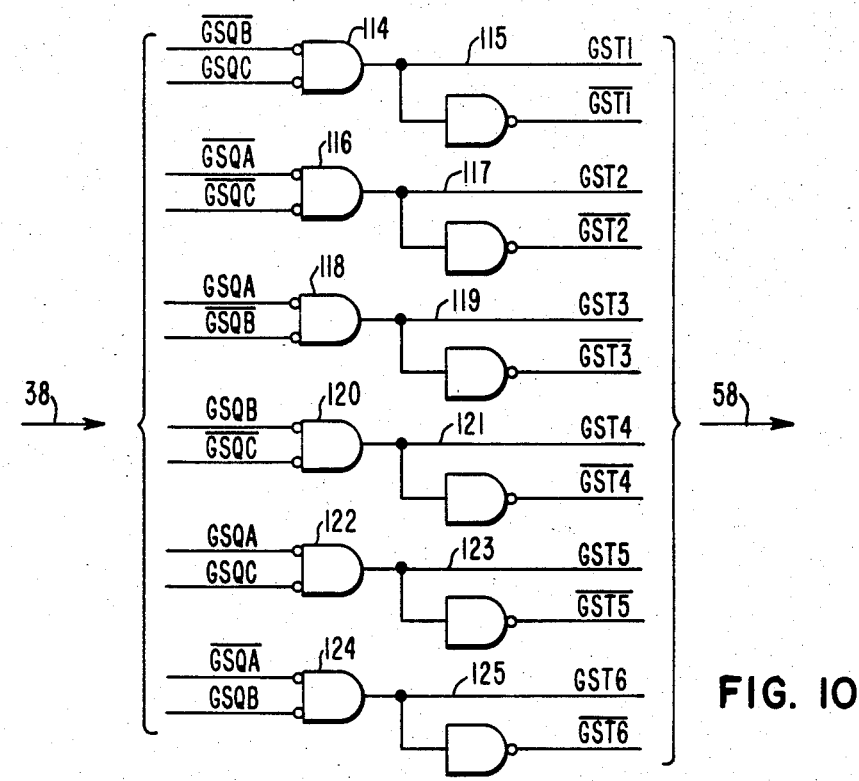
FIG. 10 shows the generation of the gating states in the thyristor sequence.
Figure 12:
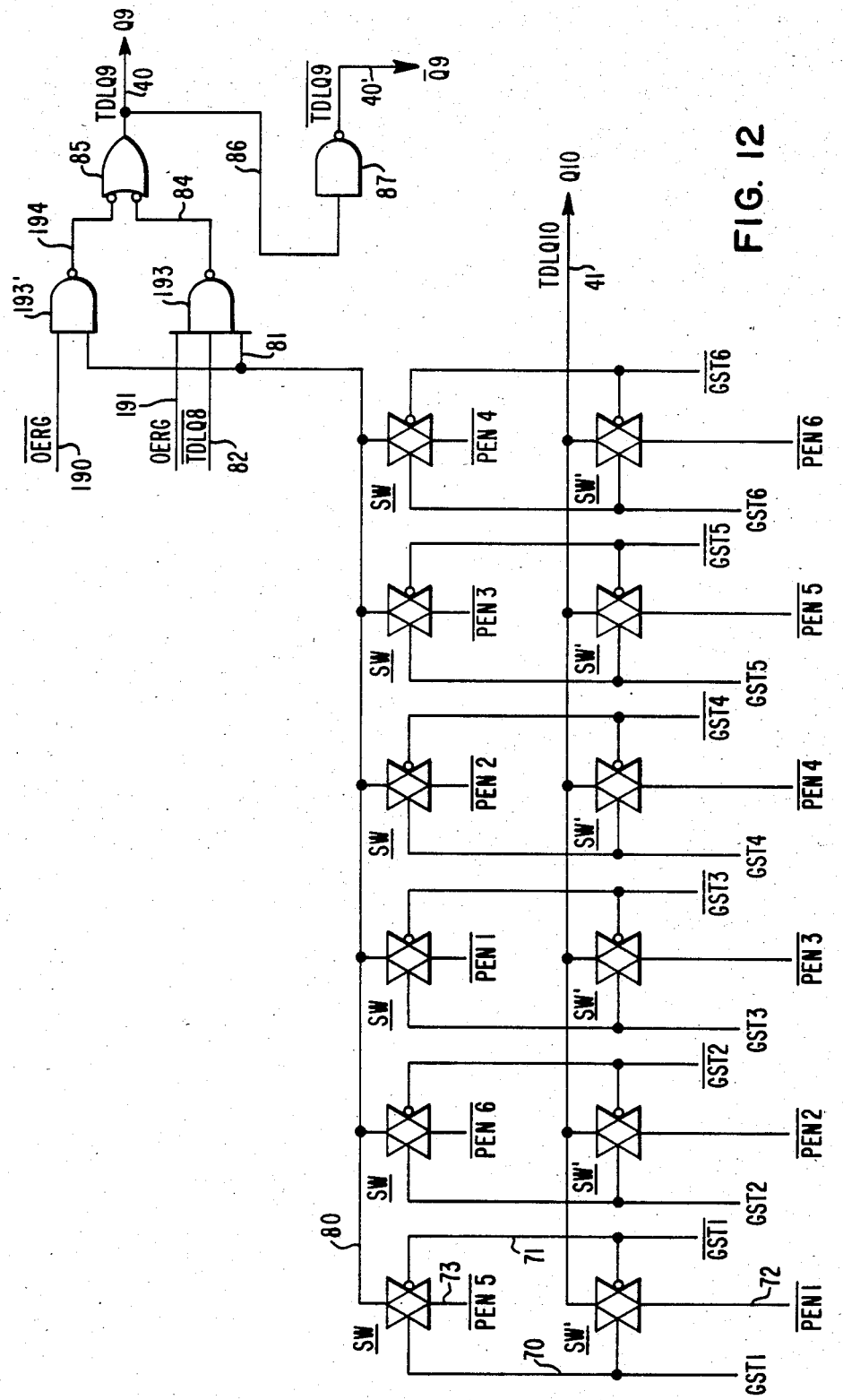
FIG. 12 is the part of the logic circuit used to generate signals Q9 and Q10 of FIG. 5.

FIG. 9 shows the gating state counter GST, the pulse triggering circuitry and the end-stop circuitry. FIG. 10 shows circuit controlling the distributor in response to the gating state counter. FIG. 11 is part of the logic circuit LC responsive to TDL and GSC for the generation of Q8. FIG. 12 is the portion of the logic circuit LC providing Q9 and Q10.

Referring to FIG. 9, the signal of line 13 from comparator CMP indicates whether the ramp count is below the reference count, or whether the ramp count has reached the reference count, or is about there. In the latter instance, the signal AGRTB inputted on the D pin of solid state device 23 generates on line 24 a ONE. Line 24 is one input of ANP device 25. The other input on line 113 if high indicates whether the END Stop logic of lines 103-109 does not inhibit firing (above 7.5° and low on line 111) and whether Q10 on line 4 is low (below 240°). In such case both zero and lines 111 and 41, causes a ONE on line 113. When line 24, upon a firing command, becomes a ONE, by AND device 25, line 26 and OR device 27, the signal GSQX of line 28 inputs a firing command at the input D of solid state device 29. If it is so, lines 37 and 37' form the Q and $\overline{Q}$ outputs which cause the gating state counter GST to assume the "next" state in the sequence of the six states. At the same time line 37 by line 50 passes a firing command (by AND device 51, line 53 and line 54) to trigger the firing gate pulse generator GPG (by line 19 in FIG. 1).

Such a firing command will also take place if Q10 by line 41 is a ONE. Overriding the signal of line 24 and the signal of line 41, is the END STOP signal of line 111 to AND device 112, if the operative angle (reference signal) is below 7.5° according to the logic of input lines 103-109 (involving Q6, Q7, Q5, Q8 and Q9 of the motor ramp). Then, no firing pulse can take place. Overriding the signal of line 26 between AND device 25 and OR device 27, is the END STOP signal of device 93 which according to lines 100 and lines 101 (responding to Q5, Q6, Q7, Q9 on lines 94-97) cause firing when the phase delay of 225° is reached in the absence of firing by CMP. There is also the signal $\overline{OERG}$ of line 90 which allows, beyond OR device 91' by line 92, firing when OERG establishes a limit at 180°. AND device 93 responds to lines 100, 101 and 92. The output of line 102 provides an alternative firing to the firing line 26, since lines 26 and 102 are inputted into OR device 27. The six stages of the gating state counter GSC (a Johnson counter) appear as a combination GSQA-GSQC and $\overline{GSQA}$-$\overline{GSQC}$ on lines 43-48, going by lines 38 to the convertor of FIG. 10.

Referring to FIG. 10, the stage represented by the logic combination of lines 38 is decoded by AND devices: 114 ($\overline{GSQB}$ and GSQC); 116 ($\overline{GSQA}$ and $\overline{GSQC}$); 118 (GSQA and $\overline{GSQB}$); 120 (GSQB and $\overline{GSQC}$); 122 (GSQA and GSQC); and 124 ($\overline{GSQA}$ and GSQB). These provide GST1-GST6 at their respective outputs, from which are also derived $\overline{GST1}$-$\overline{GST6}$. The output lines 58 go, via line 19, to the distributor which is gating access to the "next" thyristor in the sequence. The signals of lines 58 are also used, as shown by FIGS. 11 and 12, within the logic circuit LC to derive Q8, Q9 and Q10.

Referring to FIG. 11, signals TDLQA-TDLQC and $\overline{TDLQA}$-$\overline{TDLQC}$, derived from the delay counter TDL (a Johnson counter) by lines 36, are applied by pairs to respective AND devices: 130 (TDLQA and TDLQC), 132 ($\overline{TDLQB}$ and TDLQC), 134 ($\overline{TDLQB}$ and $\overline{TDLQC}$), 140 ($\overline{TDLQA}$ and TDLQB), 142 ($\overline{TDLQA}$ and TDLQC) and 144 ($\overline{TDLQC}$ and TDLQB).

OR device 136 receives the outputs of AND devices 130, 132 and 134 which (referring to FIG. 6A-6B) have to be matched with GST1, GST3 and GST5, respectively, whereas OR device 146 responds to the outputs of AND devices 140, 142, 144 which have to be matched with GST2, GST4 and GST6, respectively. The output (on line 63) of OR device 136 goes to a switch SW1 controlled in accordance with GST1, GST3, GST5, whereas a switch SW2 passes the output on line 64 from OR device 146, when these match GST2, GST4, GST6. Since any combination of three suffices to determine size states, the signals from line 58 are here reduced to three, namely GST1, GST2, GST3. These are received by an OR device 59 and passed by lines 60 and 62 (the latter after inversion) to both ends of switches SW1, SW2 in order to provide the required correlation. Therefore, switch SW1, or switch SW2, provides Q8 on line 39, and $\overline{Q8}$ on line 39' (after inversion).

Referring to FIG. 12, as explained by curves (d) and (f) of FIGS. 6A-6D, six switches SW respond to a combination of three signals. For instance, one switch SW responds to signal GST1 (line 70), and $\overline{GST1}$ (line 71), to pass signal $\overline{PEN5}$ (line 72). Similarly, the switch next in line in FIG. 12, responds to GST2, and $\overline{GST2}$ to pass $\overline{PEN6}$, the following switch SW responds to GST3, and $\overline{GST3}$, to pass $\overline{PEN1}$, etc . . . . The output is on a common line 80 going to AND device 193 (by line 81) which also receives on line 82 the signal $\overline{Q8}$ from line 39' (FIG. 11). AND device 193 also receives the external signal OERG of line 191 which tells whether the limit delay angle of 280° has been reached (which, as an option, could be chosen as low as 180°). The alternative situation is provided by AND device 193' which responds to $\overline{OERG}$ on line 190 and to line 80. The outputs of line 84 from AND device 193, and of line 194 from AND device 193', go to OR device 85 to generate Q9 on line 40, and $\overline{Q9}$ on line 40', the latter after inversion (87).

FIG. 12 shows another array of six switches SWI, also responding to respective states (QST1, $\overline{GST1}$); (GST2, $\overline{GST2}$); etc . . . to pass respectively $\overline{PEN1}$ (line 72) $\overline{PEN2}$, etc . . . . The signal outputted on common line 41 is the logic signal Q10.

Figure 13:
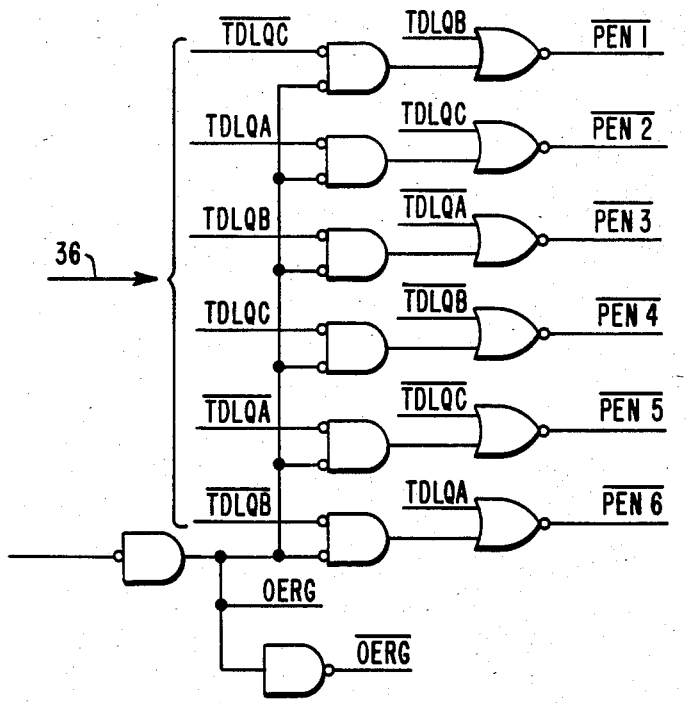
FIG. 13 is circuitry typically used to generate the pulse-enable signals of FIGS. 6A-6D.

FIG. 13 shows how signals $\overline{PEN1}$ . . . $\overline{PEN6}$ are derived, illustratively. $\overline{TDLQC}$ and $\overline{TDLQB}$ are associated with $\overline{PEN1}$. $\overline{TDLQA}$ and TDLQC are associated with $\overline{PEN2}$; TDLQB and $\overline{TDLQA}$ are associated with $\overline{PEN3}$; TDLQC and $\overline{TDLQB}$ with $\overline{PEN4}$; TDLQA and $\overline{TDLQC}$ with $\overline{PEN5}$; and $\overline{TDLQB}$ and TDLQA with $\overline{PEN6}$. FIG. 13 represents, thus, an embodiment of circuit PENC of FIG. 1.

The invention has been described for the purpose of illustration within the context of the preferred embodiment. It is understood that this aspect should not be considered as limitative. For instance, four zones totalling 240° are not exclusive of another choice. Also, the phase shift between ramp has been chosen to be 60° assuming six thyristors as shown in FIG. 2. If there be twelve thyristors in an array, the phase shift between ramps, and the range of a zone, would be 30°.

I claim:

1. In a digital gate pulse generator for equidistant and sequential firing of a plurality of static switches arranged in a sequence across a multi-phase AC power supply; including a ramp generator for providing a plurality of individual ramps matching in number and order said sequence of static switches; a reference count representing a desired firing angle; and a comparator responsive to said reference count and a ramp count on one individual ramp for firing a corresponding static switch at said firing angle; the combination of:

a master counter for recurrently counting through a ramp zone representing in electrical degrees the phase shift between two successive individual ramps to derive an instantaneous ramp zone count;

a delay counter responsive to said master counter for assuming successive states, each representing a segment of the complete cycle of said AC power supply, said segment representing a number of electrical degrees equal to said phase shift;

a state counter responsive to static switch firing for assuming successive states, each representing one state of said firing sequence;

logic means responsive to said delay counter and to said state counter for generating a logic count characterizing a corresponding one of said ramp zones;

said instantaneous ramp zone count being combined with said logic count for providing an intantaneous ramp count on an operative individual ramp and within a corresponding ramp zone.

2. The generator of claim 1 with said master count and logic count providing an instantaneous ramp count running through a corresponding ramp zone and from ramp zone to ramp zone to match said reference count; said comparator causing firing of a thyristor upon matching of said instantaneous count with said reference count.

3. The generator of claim 2 with said comparator stator switch firing operation causing through said state counter and said logic means a shift back to a preceding ramp zone and concurrently a shift forward to a subsequent individual ramp, as expressed by a new instantaneous ramp count; said comparator being operative on said subsequent individual ramp and within the same ramp zone to equidistantly fire the next static switch at said desired firing angle beyond said new instantaneous ramp count.

4. The generator of claim 2 with said comparator static switch firing operation causing through said state counter and said logic means a shift back to a preceding ramp zone and concurrently a shift forward to a subsequent individual ramp as expressed by a new instantaneous ramp count; said comparator static switch firing operation causing another static switch firing upon a subsequent static switch if said new instantaneous ramp count exceeds said reference count due to an intervening change thereof; said state counter and logic means causing upon said another static switch firing a concurrent ramp zone shift back and individual ramp shift forward, thereby defining another instantaneous ramp count; such concurrent shift back to a ramp zone and shift forward to a subsequent individual ramp occurring until said comparator can follow the ramp in the ramp zone from the last instantaneous ramp count to the new reference count.

5. The generator of claim 1 with said AC power supply being a three-phase supply; there being six static switches to be fired in sequence in a bridge thereacross; said ramp zones and said individual ramp phase shift amounting to 60 electrical degrees.

6. The generator of claim 1 with said AC power supply being a three-phase power supply; there being twelve static switches to be fired in sequence in a bridge thereacross; said ramp zones and individual ramp phase shift amounting to 30 electrical degrees.

7. The generator of claim 5 with said firing angle being limited to be less than 240 electrical degrees; said ramp zones per individual ramp being limited to four covering the range of 0 to 240 electrical degrees per ramp.

8. The generator of claim 7 with said logic means generating a combination of two binary digits as the logic count, such two-digit combination being combined with said instantaneous ramp zone count, thereby defining an instantaneous ramp count pertaining to a ramp zone defined by said two-digit combination.

9. The generator of claim 8 with said logic means including means for generating a blocking signal when forward ramp zone shifting by said logic means tends to exceed the fourth of said ramp zones.

10. The generator of claim 9 with said blocking signal being derived from a combination of state counter logic states and permissive logic signals limiting static switch firing individually within such allowed 240 electrical degrees firing.

11. The generator of claim 10 with said blocking signal causing a static switch firing.

12. The generator of claim 1 with said firing angle being determined by an analog reference voltage signal, said reference count being an inverted representation of said analog reference voltage signal.

13. The generator of claim 1 with said ramp generator, delay counter, state counter and logic means being part of a large scale integrated (LSI) chip.

14. The generator of claim 13 with said LSI chip including end-stop logic circuitry, firing logic circuitry and pulse suppression logic circuitry.

15. The generator of claim 14 with said LSI chip being responsive to a clock signal from AC line sychronized circuitry, to an analog comparator integrating circuit and to a gate suppression command signal, and said LSI chip outputting static switch gating signals.

16. A method of performing a comparison between a reference count representing a desired firing angle and a ramp count representing instantaneous electrical degrees and pertaining to one of a plurality of individual ramps shifted from one another by the phase shift of a multiphase AC power supply having a plurality of power switches to be fired in sequence thereacross, comprising the steps of:
    ramping through a predetermined zone of an operative individual ramp until matching with said reference count when said reference count is inside said zone, a power switch "next" to be fired being fired concurrently with such matching,
    initiating upon said firing another ramping step with an individual ramp which is next, and through the same ramp zone as said zone;
    thereby causing equidistant firing of said power switches in sequence from individual ramp to individual ramp, always starting from the same count in such ramp zone when ramping.

17. The method of claim 16, with each individual ramps being divided into zones equal to said zone, each of said zones being equal to said phase shift, and including the further steps:
    when said reference count is outside a zone including said ramp count, shifting to the origin count of a zone adjacent thereto, by ramping through when said reference count is further on, by jumping back when said reference count is situated opposite the direction of ramping;
    said firing of power switches being commanded upon such jumping back step, thereby shifting to another individual ramp and within the adjacent zone thereof.

* * * * *